United States Patent

Asano

[11] Patent Number: 4,459,093
[45] Date of Patent: Jul. 10, 1984

[54] APPARATUS FOR SEVERING AND FEEDING THERMOPLASTIC SHEET

[75] Inventor: Kazuo Asano, Nagoya, Japan

[73] Assignee: Kabushiki Kaisha Asano Kenkyusho, Nagoya, Japan

[21] Appl. No.: 328,767

[22] Filed: Dec. 8, 1981

[30] Foreign Application Priority Data

Dec. 8, 1980 [JP] Japan ............... 55-172746

[51] Int. Cl.³ .................................. B29C 17/14
[52] U.S. Cl. .......................... 425/297; 264/40.7; 264/148; 425/145; 425/168; 425/315; 425/412; 425/DIG. 48
[58] Field of Search ....... 425/297, 296, 315, DIG. 48, 425/145, 168, 412, 422; 264/148, 290.2, 40.7

[56] References Cited

U.S. PATENT DOCUMENTS

| | | | |
|---|---|---|---|
| 3,332,819 | 7/1967 | Siempelkamp | 425/315 X |
| 3,346,923 | 10/1967 | Brown et al. | 425/DIG. 48 |
| 3,551,546 | 12/1970 | Gosper et al. | 264/290.2 |
| 3,676,539 | 7/1972 | Fisher | 264/290.2 |
| 4,072,792 | 2/1978 | Araki et al. | 264/290.2 |
| 4,097,566 | 6/1978 | Bertin et al. | 425/315 X |

Primary Examiner—Donald E. Czaja
Assistant Examiner—James Housel
Attorney, Agent, or Firm—Jordan and Hamburg

[57] ABSTRACT

Apparatus for severing thermoplastic sheet continuously produced from an extruder and successively feeding a length of plastic web to an intermittently operated forming machine. The extruded and cooled sheet drops from a roller down on a belt conveyor running at the same speed as the extrusion rate and is transferred towards the forming machine by a pair of clamp chains. The chains extend from sprocket wheels located in the range of the belt conveyor and are adapted to run intermittently at a speed higher than the extrusion rate and in accordance with the operation of the forming operation. The running speed of the conveyor belt can be increased to the higher speed when the falling sheet has been severed thereabove in the suspended position so that the severed plastic web is grasped by the clamp chains to be fed to the shaping station of the forming machine.

6 Claims, 4 Drawing Figures

APPARATUS FOR SEVERING AND FEEDING THERMOPLASTIC SHEET

BACKGROUND OF THE INVENTION

This invention relates generally to an apparatus for severing and feeding a thermoplastic sheet to a forming machine, and, more particularly, to apparatus for severing a sheet continuously produced from an extruder and successively feeding a desired length of the severed plastic web to an intermittently operated forming machine.

Various thin walled articles of thermoplastic material such as cups, trays, buckets, tubes and the like have been produced by means of forming machines comprising a pair of male and female dies adapted to move between the closed position and the open position where heated and consequently softened thermoplastic sheet is brought between the separated dies by means of a pair of endless link chains respectively provided with a plurality of clamps so as to grasp opposite side edges of the sheet.

It is possible of course to heat the plastic webs each previously prepared in a desired length up to a temperature suitable for thermal forming method ranging from 130° to 180° C. which is varied depending on the type of material and to then feed each to the forming machine.

It is obviously preferable, however, to combine the forming machine with the extruder in a line so that the plastic sheet extruded from the fish tail-shaped nozzle thereof and at a fairly high temperature, for instance, ranging from 200° to 240° C. is directly fed to the forming machine.

In this direct feeding method, some means must be provided so as to compensate for the lag caused from the continuous extrusion of the sheet and the intermittent feeding of the continuous sheet or severed webs to the forming machine. This compensation has generally been made by the so-called dancing roll means, but it is not always satisfactory above all when operating at a high speed as is well known to those skilled in the art.

SUMMARY OF THE INVENTION

The invention has for its object to provide an apparatus for smoothly severing a continuously extruded plastic sheet to a desired length of web and smoothly feeding the web successively to the forming machine.

This object is attained according to the invention by providing essentially conveyor belt means adapted to run at first speed corresponding to the extrusion rate for receiving plastic sheet continuously extruded and falling thereon to be transferred towards the forming machine, and selectively at a higher second speed corresponding to the running speed of a pair of clamp chains, each extending from a rear sprocket wheel which is located on the conveyor belt means via the article shaping station of the forming machine to a front sprocket wheel where the formed article is released; and severing means located above said conveyor belt means at a point where plastic sheet is continuously falling so as to be actuated to sever the plastic sheet while it is in a vertical position when a predetermined length thereof has been received on the conveyor belt means which means is adapted to be then driven to run at said second speed so that the severed plastic web is grasped at the opposite side edges thereof successively by clamps mounted on said endless chains which are adapted concurrently to be actuated to run at the same speed for transferring the plastic web to a molding zone.

BRIEF DESCRIPTION OF THE DRAWINGS

The invention shall be explained in more detail as to a preferable embodiment in reference to the accompanying drawings, in which.

DESCRIPTION OF THE PREFERRED EMBODIMENTS

Figure 1:
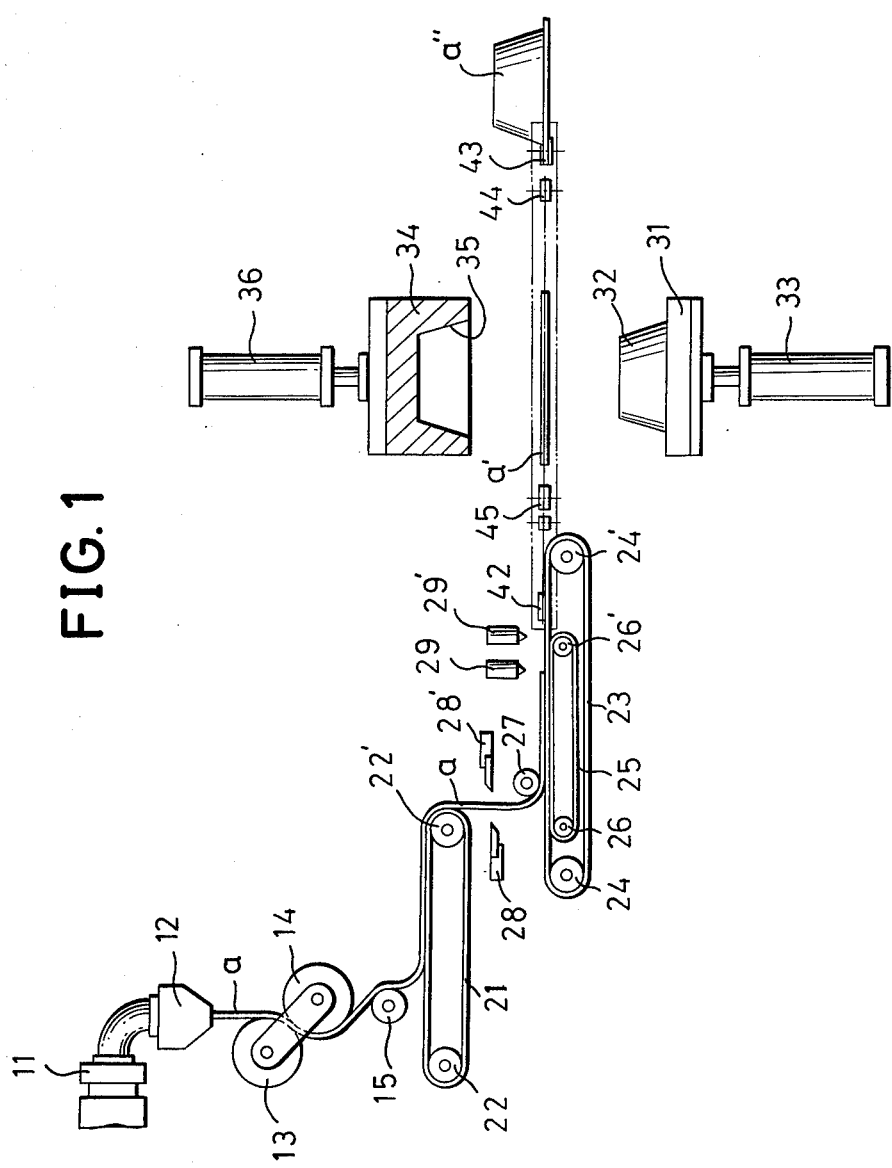
FIG. 1 is a diagrammatic side view of the apparatus according to the invention together with the usual extruder and the forming machine.
Figure 2:
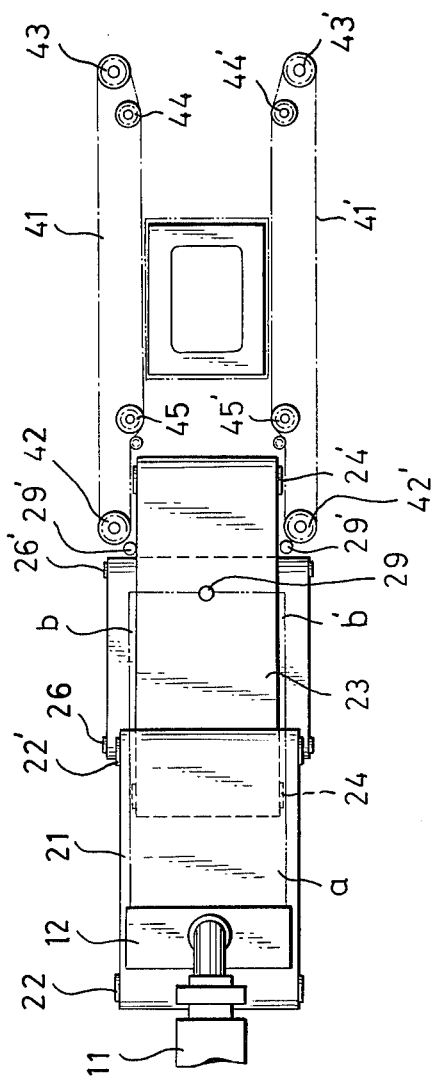
FIG. 2 is a diagrammatic plan view of the above.

In FIGS. 1 and 2, at an outlet 11 of the extruder mounted is a fish tail nozzle 12 so that a thermoplastic sheet a of the corresponding thickness and width is continuously extruded at a rate such as 10.0 cm/sec. Depending on the kind of plastic material, the temperature of the extruder sheet is varied, but it is generally at least 200° C. This sheet is cooled by means of rollers 13, 14 at the both sides thereof down to a temperature of about 150° C. The plastic sheet a is then guided by a roll 15 to descend onto an endless belt 21 which is slightly wider than the width of the plastic sheet and which travels on pulleys 22, 22' at a speed substantially the same as the extrusion rate so as to move the sheet towards the forming machine.

Under said conveyor belt 21, is arranged belt means according to the invention which comprises an endless belt 23 which is narrower than the plastic sheet and travels on a rear pulley 24 and a front pulley 24' so that the leading end of the plastic sheet a descending from the front pulley 22' of the upper conveyor belt 21 is received by the lower belt 23 and when this is run at the same speed as the extrusion rate and consequently at the running speed of said upper conveyor belt 21 the plastic sheet a is moved further towards the forming machine.

The endless belt 23 is narrower than that of the plastic sheet a as referred to above, and consequently the opposite side edges b, b' thereof protrude as shown in FIG. 2 so as to be grasped by clamps as explained below. In order to prevent said transversely protruding side edges of the plastic sheet from dangling, there is provided auxiliary conveyor belt means comprising an endless belt 25 wider than the plastic sheet a, a rear pulley 26 and a front pulley 26'. Naturally the upper run of the belt 25 is adapted to run just below that of the belt 23 and at the same speed. The pulleys 26, 26' are arranged within the plane of the pulleys 24 and 24'.

It is preferable to provide a guide roller 27 just above the upper run of the belt 23 at the point where the plastic sheet a drops from the belt 21 so that the leading end of the sheet may be smoothly received by the belt 23.

Between the front pulley 22' for the belt 21 and said guide roller 27 there is arranged a pair of cutter blades 28, 28' operable at a high speed so that the running plastic sheet a may be severed in vertical position. These blades 28, 28' may be actuated for instance by a solenoid (not shown) in response to a signal given by a photoelectric detector 29 located above the conveyor belt 23 at a suitable position.

The forming machine, which forms no part of this invention, comprises a male die 31 having a punch 32 and a hydraulic jack 33 for moving die assembly 31, 32 upwards for engaging with a female die 34 having a cavity which is moved downwards by a hydraulic jack 36 in the molding position.

In order to bring the severed plastic web a' to the shaping station, there are provided a pair of endless chain belts 41, 41', each mounted with a plurality of clamps, which will be explained later in reference to FIGS. 3 and 4.

Said clamp chains 41, 41' are respectively extended around sprocket wheels 42, 42'; 43, 43' and guided by sprocket wheels 44, 44'; 45, 45' so that the plastic web a' grasped at the side edges thereof by the clamps may be correctly brought to the shaping station between the separated male and female dies. After the shaping operation, the clamp chains are driven again so that the web a' now having a shaped article a'' thereon may be brought to a releasing station where said sprocket wheels 43, 43' are located (at the right of the chains 41, 41' in FIGS. 1 and 2) for stamping the article a'' out of the remaining portion of the web a'. The opposite sprocket wheels 42, 42' (at the left of the chains 41, 41' in FIGS. 1 and 2) are located above the upper run of the belt 23 just in front of the front end of the auxiliary belt 25 so that transversely protruded side edges b, b' of the plastic web a' which are supported by the auxiliary belt 25 extend beyond the auxiliary belt and may be grasped by the clamps.

Figure 3:
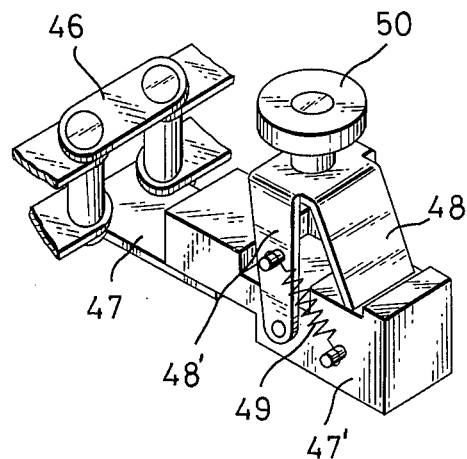
FIGS. 3 and 4 are perspective views of the clamp mounted on the link of the endless chain belt shown respectively in the normal closed position and the open position together with cam means illustrated in phantom lines.
Figure 4:
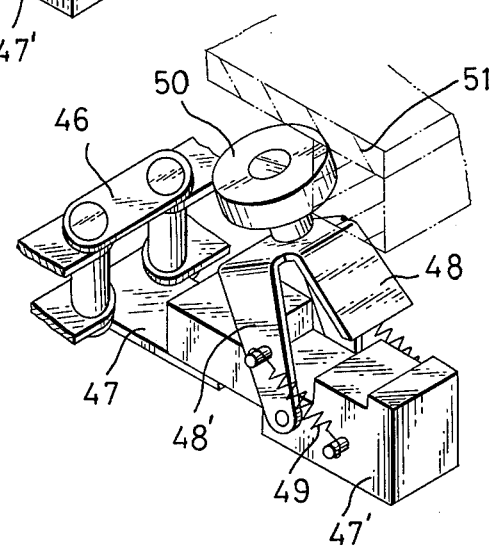

In FIGS. 3 and 4, and referring to a link 46 which constitutes the endless chain 41 (41') there is fixedly mounted a plate member 47. A stationary member 47' of the clamp is fixedly mounted on said plate member 47 so as to transversely and outwardly protrude from the endless chain 41 (41'). On the stationary member 47', a movable member 48 is pivotally mounted so that a nail portion 48' thereof may abut on the flat surface near the free end of said stationary member 47'. There is provided a spring means 49 so as to normally urge the movable member 48 against member 47'. The movable member 48 is pivotally moved against the force of said spring means to be in the open position by means of a cam means 50, 51 located in the vicinity of the rear and front sprocket wheels 42 (42') and 43 (43') of the clamp chain(s). Thus the plastic web a' having been away of the range of the auxiliary conveyer belt 25 and entered the range of the clamp chains 41, 41' is grasped successively by the open clamps to be soon closed by said spring means.

To comply with the intermittent operation of the forming machine, the clamp chains to be also intermittently driven must run at a higher speed in comparison with the extrusion rate and the running speed of the belt 21. Thus as referred to above the belt 23 is driven at a speed same as the extrusion rate and consequently at the running speed of the belt 21, until the plastic sheet is severed severing. When the plastic sheet a has been severed and when the leading end of the severed web a' is going to reach at the front end 26' of the auxiliary belt 25 and consequently at the rear end 42, 42' of the clamp chains 41, 41', these clamp chains must be actuated to run at said speed, and the running speed of said belt 23 must be changed to the second speed which is same as that of clamp chains.

For that purpose there is provided another photoelectric detector 29' above the belt 23 and the chains 41, 41' at the boundary thereof. There will be no need for explanation on the electric and mechanic means for receiving the signal therefrom and for said actuation and speed changing, since these are obvious to those skilled in the art and since they themselves are not the subject of the invention.

I claim:

1. Apparatus for severing a thermoplastic sheet continuously produced by an extruder and successively feeding the resulting severed web to an intermittently operated forming machine, comprising a first conveyor belt means adapted to continuously run at a first speed substantially corresponding to the extrusion rate of the extruder and positioned below said extruder so as to receive a thermoplastic sheet continuously falling thereon and feed the same towards said forming machine, a second conveyor belt means positioned below said first conveyor belt means such that the leading edge of said sheet is lowered down unsupported to said second conveyor belt means by said first conveyor belt means, and adapted to alternatively run at the same speed as said first speed of said first conveyor belt means and at a second speed higher than said first speed so as to receive said sheet from said first conveyor belt means and continuously feed the same, a severing means between said first and second conveyor belt means to cut said sheet into a web, means arranged above said second conveyor means to detect a leading edge of said sheet for actuating said severing means to sever a desired length of web and actuate a driving means for said second conveyor means so as to change its running speed from said first to said second speed, and a pair of endless belt means having a plurality of clamps to grasp each side edge of said severed web and feed the same to a shaping station of said forming machine.

2. Apparatus according to claim 1, wherein an endless belt of the second conveyor belt means is narrower than said web, and there is provided an auxiliary conveyor belt means having an endless belt wider than said web so that opposite side edges thereof transversely protruding out of the endless belt of said second conveyor belt means are prevented from dangling beyond said auxiliary conveyor belt means and exposed side edges of said severed web beyond said narrower belt are grasped by the clamps of said pair of endless belt means.

3. Apparatus for severing a thermoplastic sheet continuously provided by an extruder and feeding the resulting web to an intermittently operated forming machine, comprising a first conveyor adapted to operate continuously at a first speed corresponding substantially to the extrusion rate of, and positioned below said extruder to receive a thermoplastic sheet of a given width and advance the same; a second conveyor narrower than said sheet, below said first conveyor to receive said thermoplastic sheet lowered unsupported from said first conveyor; means for alternately driving said second conveyor at the same speed as said first speed and at a higher second speed; severing means between said first and said second conveyors for cutting said sheet into a web having opposite transverse and leading edges; first detecting means above said second conveyor for detecting said leading edge of said sheet and actuating said severing means to sever a given length of web and to cause said driving means to operate at said second speed; endless chain belts mounted perpendicularly to said first and second conveyors; means for driving said chain belts; clamps on said chain belts extending toward said transverse edges of said web for grasping said edges and feeding said web to said forming machine; second detecting means above said second conveyor and said chain belts for detecting said leading edge and for actuating means for driving and changing the speed of said chain belts in synchronism with said first and second conveyors, and for changing the speed of said second conveyor to substantially that of said chain belts.

4. Apparatus according to claim 3, wherein said second conveyor comprises an endless belt moving on pulleys and there is provided below said belt a wider auxiliary endless belt running at the same speed as said second conveyor.

5. Apparatus according to claim 3, further comprising a guide roller above said second conveyor to guide the leading edge of the sheet from said first conveyor to said second conveyor.

6. Apparatus according to claim 3, wherein said clamps comprise a stationary member and a movable member pivoted thereon and spring means normally urging said movable member against said stationary member for grasping said edges of said belt between said members.

* * * * *